(12) United States Patent
Chang et al.

(10) Patent No.: US 12,388,215 B2
(45) Date of Patent: Aug. 12, 2025

(54) ELECTRONIC DEVICE AND ASSEMBLY THEREOF

(71) Applicant: Getac Technology Corporation, New Taipei (TW)

(72) Inventors: Kuang-Yeh Chang, Taipei (TW); Juei-Chi Chang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 372 days.

(21) Appl. No.: 18/136,273

(22) Filed: Apr. 18, 2023

(65) Prior Publication Data

US 2024/0106159 A1    Mar. 28, 2024

Related U.S. Application Data

(60) Provisional application No. 63/410,571, filed on Sep. 27, 2022.

(30) Foreign Application Priority Data

Feb. 22, 2023  (CN) ......................... 202310147992.X

(51) Int. Cl.
*H01R 13/52*   (2006.01)
*G06F 1/16*   (2006.01)

(52) U.S. Cl.
CPC ....... *H01R 13/5202* (2013.01); *G06F 1/1656* (2013.01)

(58) Field of Classification Search
CPC .......................... H01R 13/5202; G06F 1/1635
USPC ..................................................... 174/50.52
See application file for complete search history.

(56) References Cited

U.S. PATENT DOCUMENTS

| 4,795,173 | A | * | 1/1989 | Osborne | .................. F16J 15/56 |
| | | | | | 277/467 |
| 8,089,757 | B2 | | 1/2012 | Chen et al. | |
| 8,454,101 | B2 | | 6/2013 | Kuo | |
| 9,772,658 | B1 | | 9/2017 | Hsu | |
| 10,199,763 | B2 | | 2/2019 | Zhu et al. | |
| 10,468,812 | B1 | | 11/2019 | Lee et al. | |
| 11,296,470 | B2 | * | 4/2022 | Mizrahi | ............... H01R 13/631 |

(Continued)

FOREIGN PATENT DOCUMENTS

| CN | 107437595 A | 12/2017 |
| CN | 114981134 A | 8/2022 |

(Continued)

*Primary Examiner* — Adrian S Wilson
(74) *Attorney, Agent, or Firm* — Cooper Legal Group, LLC

(57) ABSTRACT

An electronic device includes a casing and an electronic assembly. The casing has an opening between a first side surface and a second side surface parallel to each other, and the opening has a first side edge and a second side edge opposite to each other. The electronic assembly is assembled in the casing, and includes a body, a connecting portion, and a waterproof ring. The connecting portion is arranged on one side of the body. The waterproof ring includes an outer ring, an inner ring, and two blocking portions. The outer ring is a closed ring, and is arranged around an outer surface of the connecting portion. The inner ring is arranged on the outer surface of the connecting portion and is closer to the body than the outer ring. The two blocking portions are each connected to the outer ring and the inner ring.

16 Claims, 8 Drawing Sheets

(56) References Cited

U.S. PATENT DOCUMENTS

| | | | |
|---|---|---|---|
| 11,733,737 B2* | 8/2023 | Lee ...................... | G06F 1/1684 |
| | | | 361/679.02 |
| 11,876,329 B2* | 1/2024 | Mizrahi ............... | H01R 13/631 |
| 12,152,708 B2* | 11/2024 | Mitchell ................ | F16B 7/0426 |
| 2010/0099279 A1 | 4/2010 | Homme et al. | |
| 2012/0238147 A1* | 9/2012 | Matsumoto .......... | H01R 13/512 |
| | | | 439/660 |
| 2017/0084891 A1* | 3/2017 | Lu ....................... | H01M 50/267 |
| 2019/0348806 A1* | 11/2019 | Mizrahi ................ | G06F 1/1656 |
| 2020/0161800 A1* | 5/2020 | Liao .................... | H01R 13/5219 |
| 2021/0313734 A1 | 10/2021 | Gohda et al. | |
| 2022/0209479 A1* | 6/2022 | Mizrahi ................ | G06F 1/1632 |
| 2023/0262909 A1* | 8/2023 | Lee ........................ | G06F 1/181 |
| | | | 312/223.1 |

FOREIGN PATENT DOCUMENTS

| | | |
|---|---|---|
| JP | 2014150017 A | 8/2014 |
| TW | M444538 U | 1/2013 |
| WO | 2010027565 A2 | 3/2010 |

* cited by examiner

ELECTRONIC DEVICE AND ASSEMBLY THEREOF

CROSS-REFERENCES TO RELATED APPLICATIONS

This application claims the benefit of U.S. provisional application Ser. No. 63/410,571, filed on Sep. 27, 2022 and claims the priority of Patent Application No. 202310147992.X filed in China, P.R.C. on Feb. 22, 2023. The entirety of the above-mentioned patent applications are hereby incorporated by references herein and made a part of the specification.

BACKGROUND OF THE INVENTION

Technical Field

The present invention relates to an electronic device, and in particular, to an electronic device with a waterproof assembly.

Related Art

Due to a casing design of a conventional electronic device, a part of a connecting portion between an electronic assembly and the electronic device may be exposed when the electronic assembly is assembled in the electronic device. As a result, external water may seep into the casing of the electronic device through the exposed part of the connecting portion, resulting in an ineffective waterproof function.

SUMMARY OF THE INVENTION

In view of the above, an embodiment provides an electronic device, including a casing and an electronic assembly. A casing has an opening between a first side surface and a second side surface parallel to each other. The opening has a first side edge and a second side edge opposite to each other, and the first side edge and the second side edge are obliquely arranged between the first side surface and the second side surface. The electronic assembly is assembled in the casing, and includes a body, a connecting portion, and a waterproof ring. The connecting portion is arranged on one side of the body. The waterproof ring includes an outer ring, an inner ring, and two blocking portions. The outer ring is a closed ring and arranged around an outer surface of the connecting portion. The inner ring is arranged on the outer surface of the connecting portion and is closer to the body than the outer ring. The two blocking portions are each connected to the outer ring and the inner ring. When the connecting portion correspondingly passes through the opening, one side of the outer ring is in close contact with the first side surface, one side of the inner ring is in close contact with the second side surface, one blocking portion is correspondingly located at the first side edge, and the other blocking portion is correspondingly located at the second side edge.

In some embodiments, the other side of the outer ring opposite to the first side surface protrudes from the opening.

In some embodiments, the inner ring has a notch facing a top of the body.

In some embodiments, the two blocking portions are adjacent to the notch.

In some embodiments, when the connecting portion correspondingly passes through the opening, the two blocking portions are located in a range where both the first side edge and the second side edge cover the outer ring.

In some embodiments, the connecting portion has a first surface and a second surface, and the two blocking portions are respectively arranged on two opposite ends and are located in a distance range of two thirds of a distance from the first surface to the second surface.

In some embodiments, the outer ring and the inner ring are arranged at a specific distance.

In some embodiments, the two blocking portions extend in a direction parallel to an axial direction of the outer ring and the inner ring and are connected to the outer ring and the inner ring.

In some embodiments, the two blocking portions extend in a direction oblique to an axial direction of the outer ring and the inner ring and are connected to the outer ring and the inner ring.

An electronic assembly group is further provided, including a body, a connecting portion, and a waterproof ring. The connecting portion is arranged on one side of the body. The waterproof ring includes an outer ring, an inner ring, and two blocking portions. The outer ring is a closed ring and arranged around an outer surface of the connecting portion. The inner ring is arranged on the outer surface of the connecting portion and is closer to the body than the outer ring. The two blocking portions are each connected to the outer ring and the inner ring, and the two blocking portions are respectively located on two opposite ends.

In conclusion, according to the electronic device and the electronic assembly provided in the above embodiments, the waterproof ring with the outer ring and the inner ring is arranged at the connecting portion of the electronic assembly, and the blocking portions are connected to the outer ring and the inner ring. In this way, even if water flows in through either side of the connection portion, the water is stooped by the blocking portions and therefore cannot seep into the casing on the other side, to obtain a waterproof function.

DETAILED DESCRIPTION OF THE INVENTION

Figure 1:
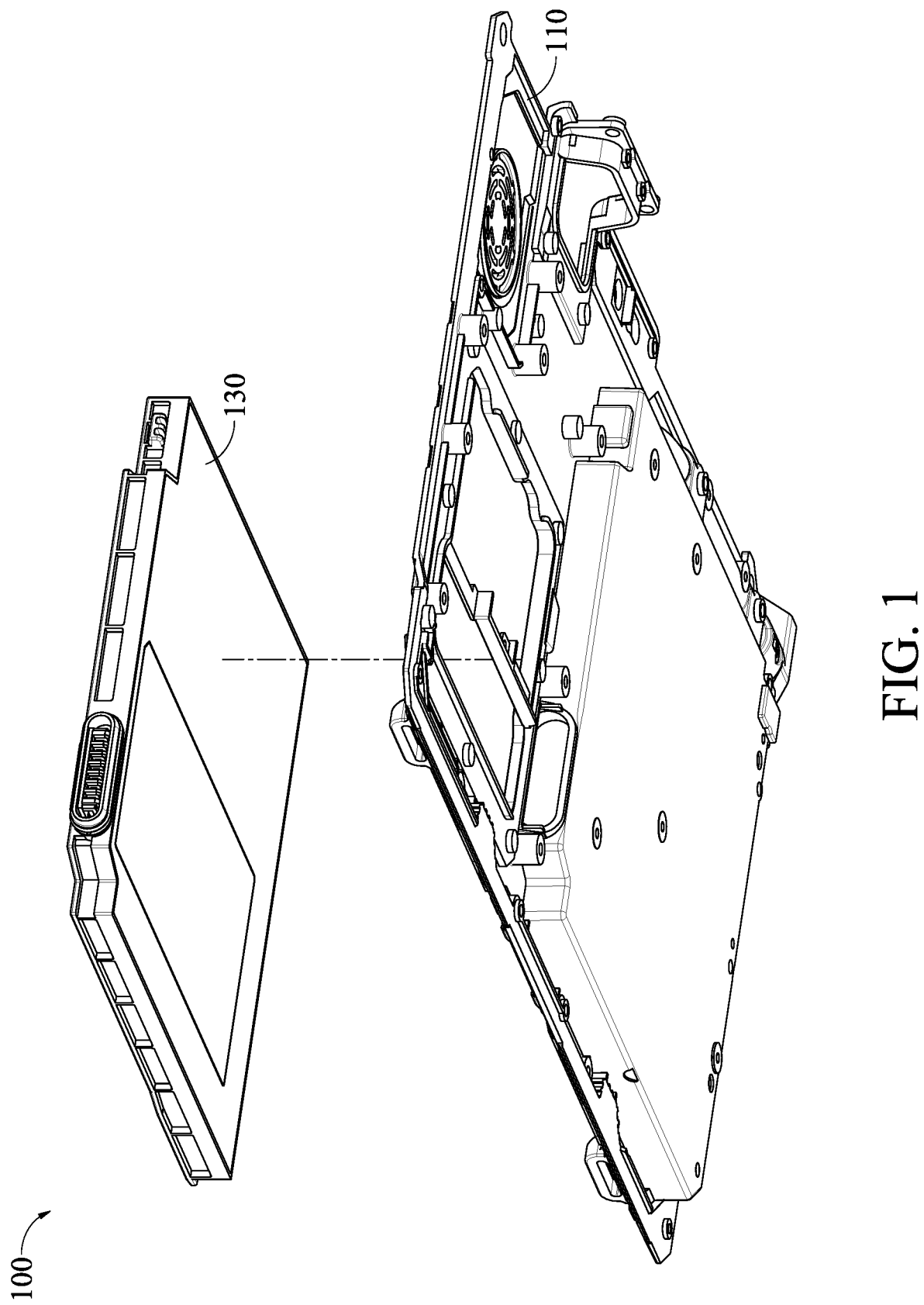
FIG. 1 is an exploded view of an electronic device according to an embodiment.
Figure 2:
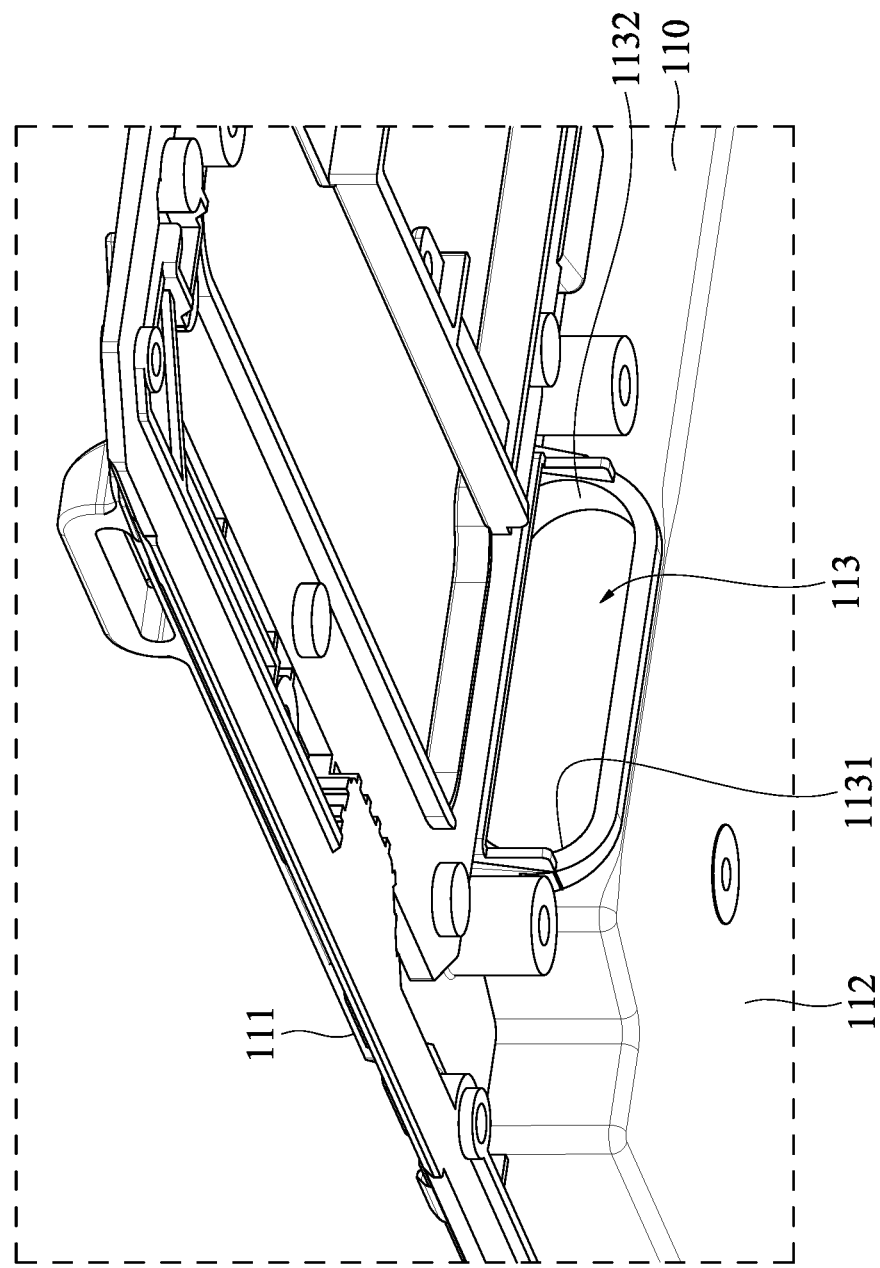
FIG. 2 is a schematic diagram of a casing according to an embodiment.
Figure 3:
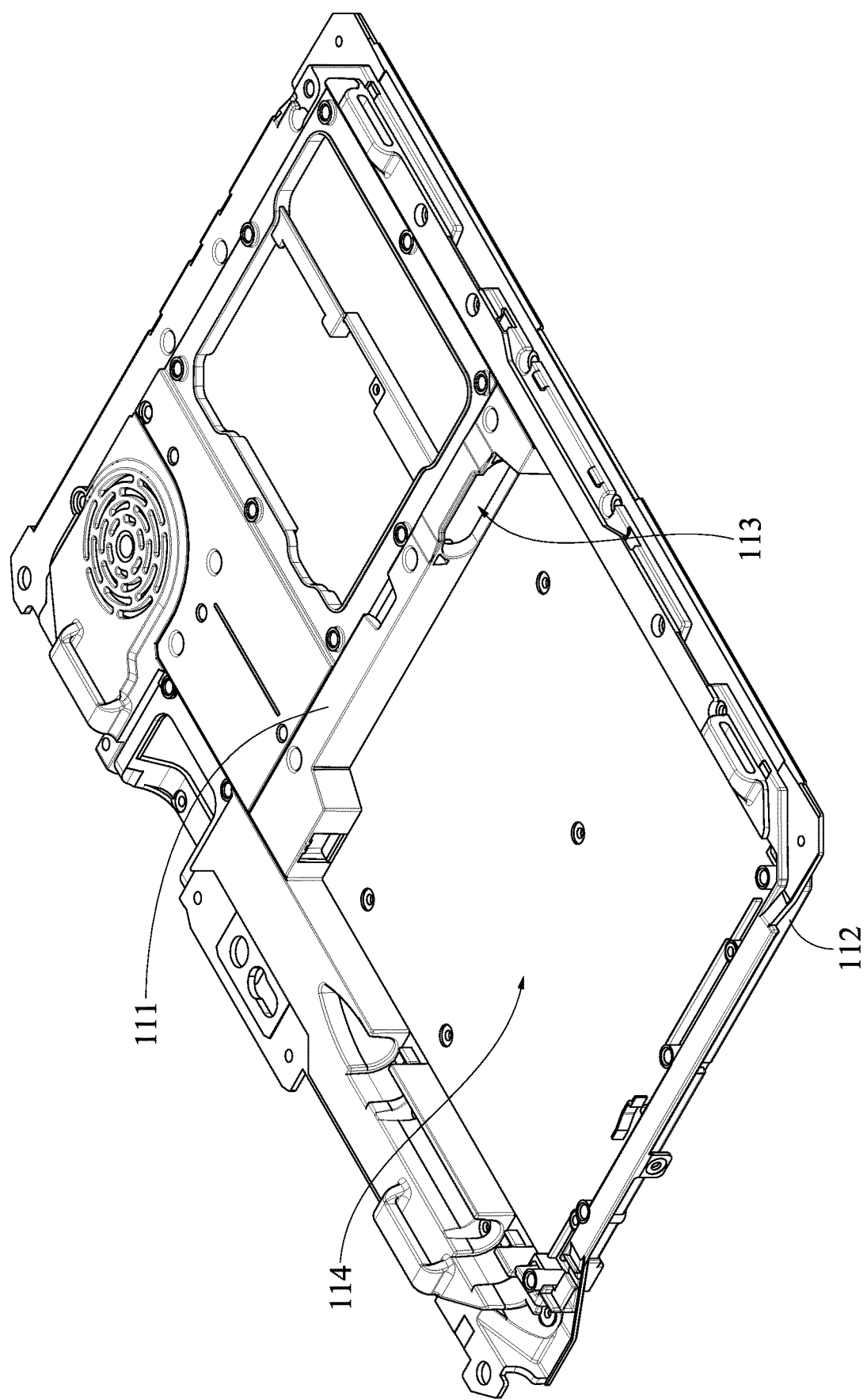
FIG. 3 is a schematic diagram of the casing according to an embodiment from another perspective.
Figure 4:
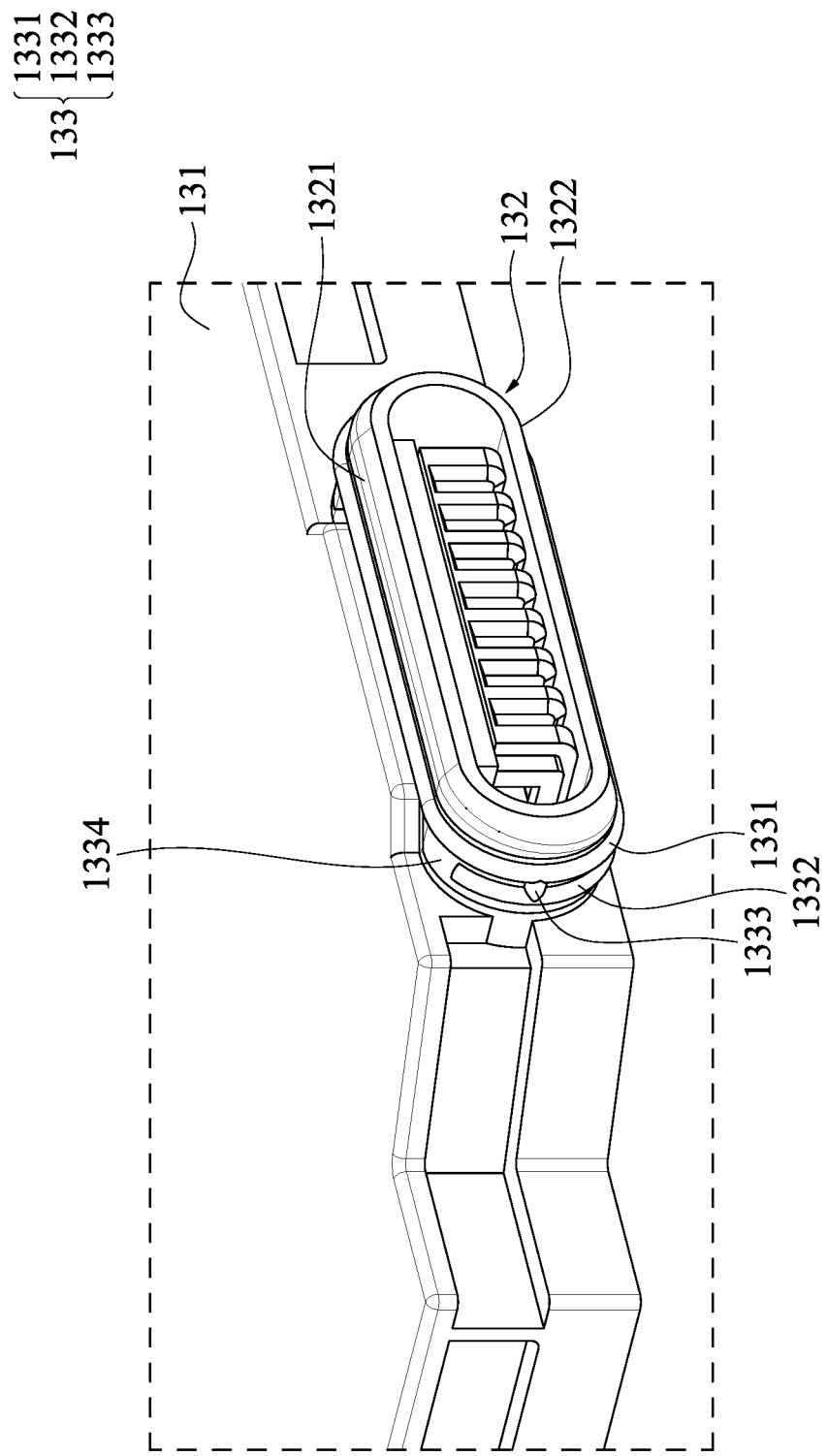
FIG. 4 is a schematic diagram of an electronic assembly according to an embodiment.
Figure 5:
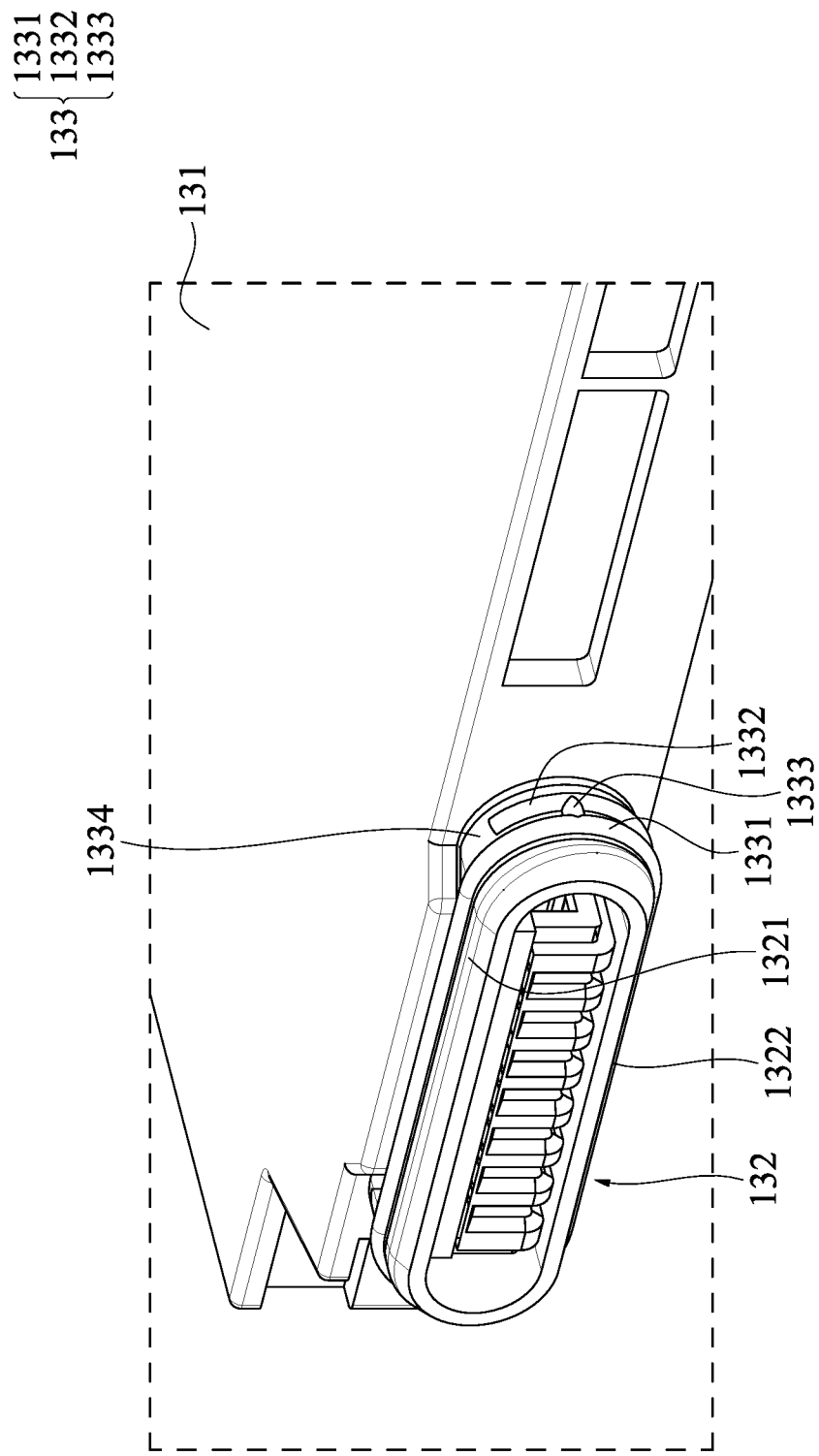
FIG. 5 is a schematic diagram of the electronic assembly according to an embodiment from another perspective.
Figure 6:
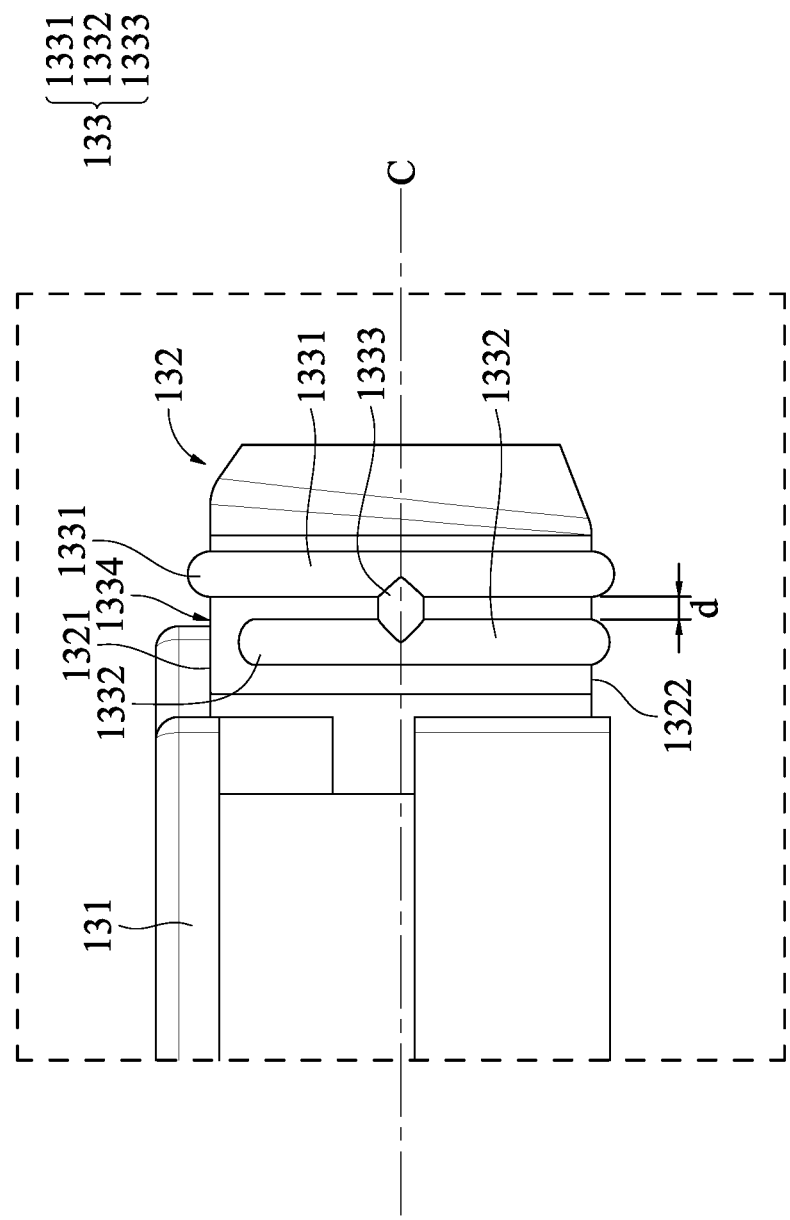
FIG. 6 is a side view of the electronic assembly according to an embodiment.
Figure 7:
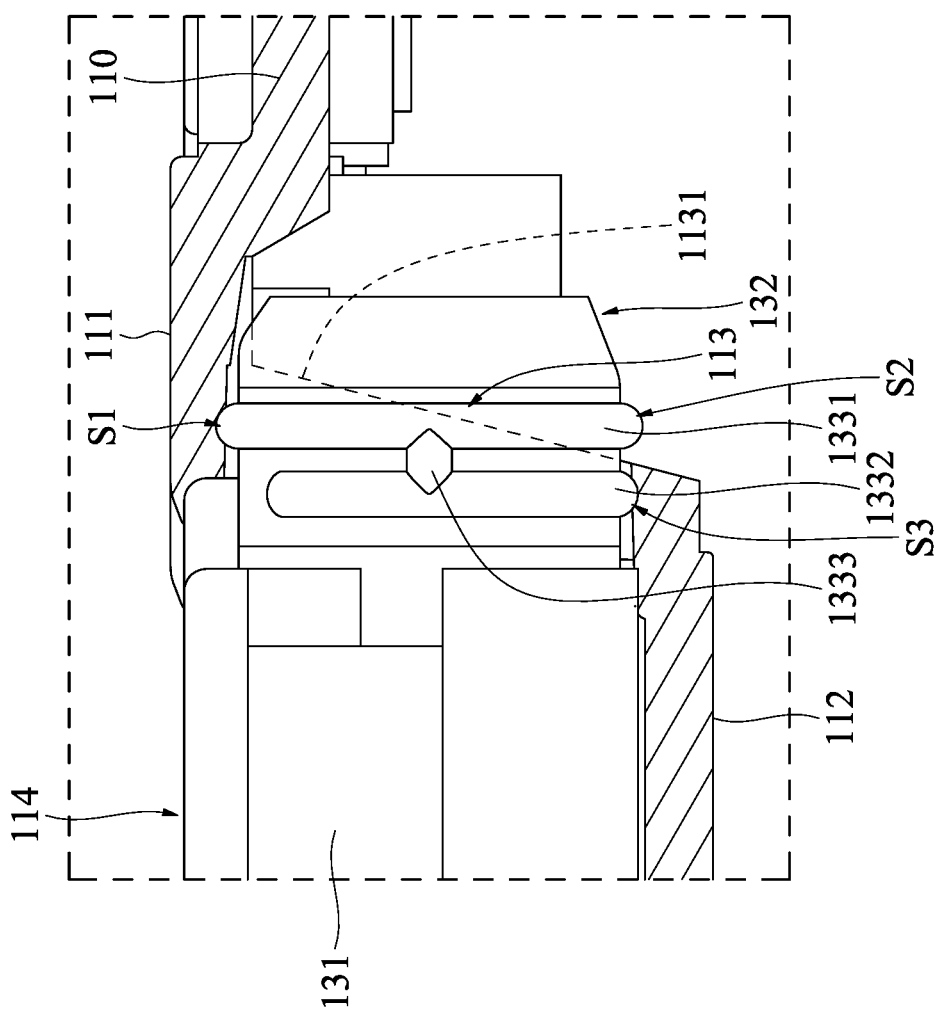
FIG. 7 is a schematic diagram of an electronic assembly assembled in an electronic device according to an embodiment.

Refer to FIG. 1 to FIG. 7. FIG. 1 is an exploded view of an electronic device according to an embodiment. FIG. 2 is a schematic diagram of a casing according to an embodiment. FIG. 3 is a schematic diagram of the casing according to an embodiment from another perspective. FIG. 4 is a schematic diagram of an electronic assembly according to an embodiment. FIG. 5 is a schematic diagram of the electronic assembly according to an embodiment from another perspective. FIG. 6 is a side view of the electronic assembly according to an embodiment. FIG. 7 is a schematic diagram of an electronic assembly assembled in an electronic device according to an embodiment. As shown in FIG. 1, an electronic device 100 includes a casing 110 and an electronic assembly 130. The electronic device 100 is, for example, a notebook computer or a tablet computer, and the electronic assembly 130 is, for example, a battery assembly, a pluggable hard disk or a pluggable CD-ROM driver, but the present invention is not limited thereto.

As shown in FIG. 2, FIG. 3, and FIG. 7, the casing 110 has a first side surface 111 and a second side surface 112 parallel to each other, and an accommodating slot 114 is formed between the first side surface 111 and the second side surface 112. The electronic assembly 130 is assembled and accommodated in the accommodating slot 114, for example. The casing 110 has an opening 113 between the first side surface 111 and the second side surface 112 parallel to each other. The opening 113 has a first side edge 1131 and a second side edge 1132 opposite to each other, and the first side edge 1131 and the second side edge 1132 are obliquely arranged between the first side surface 111 and the second side surface 112. Further, the opening 113 is correspondingly arranged on the accommodating slot 114. The first side surface 111 and the second side surface 112 are two opposite surfaces of the casing 110, and the first side edge 1131 and the second side edge 1132 extend obliquely from the first side surface 111 and are connected to the second side surface 112, and form the opening 113 for assembling the connecting portion 132 of the electronic assembly 130.

As shown in FIG. 2 and FIG. 4, the electronic assembly 130 is assembled in the casing 110 and includes a body 131, a connecting portion 132, and a waterproof ring 133. The connecting portion 132 is arranged on one side of the body 131. The body 131 of the electronic assembly 130 is assembled and accommodated in the accommodating slot 114 of the casing 110. The connecting portion 132 is caused to pass through the opening 113 to complete the assembly of the electronic assembly 130 to the casing 110. Further, the connecting portion 132 of the electronic assembly 130 is, for example, an electrical connecting terminal. The electronic device 100 has another electrical connecting terminal (not shown in the figure). The connecting portion 132 of the electronic assembly 130 may be electrically connected to other electronic components (not shown in the figure) in the electronic device 100 to supply power or transmit data.

As shown in FIG. 4 to FIG. 6, waterproof ring 133 includes an outer ring 1331, an inner ring 1332, and two blocking portions 1333. The waterproof ring 133 with double rings prevents water from seeping into the casing 110 from the outside. Moreover, the waterproof ring 133 with double rings can prevent water from seeping into the electronic assembly 130 from the outside.

The outer ring 1331 is a complete closed ring and arranged around an outer surface of the connecting portion 132. As shown in FIG. 6, the outer ring 1331 is located at an end far away from the body 131.

The inner ring 1332 is arranged on the outer surface of the connecting portion 132 and is closer to the body 131 than the outer ring 1331. As shown in FIG. 6, the inner ring 1332 is an incomplete closed ring.

The two blocking portions 1333 are each connected to the outer ring 1331 and the inner ring 1332. Although the outer ring 1331 and the inner ring 1332 are arranged at a distance d, water can be prevented from seeping through the gap between the outer ring 1331 and the inner ring 1332 by the two blocking portions 1333. A connection position and a connection manner of the two blocking portions 1333 have various implementations, which are detailed later.

When the connecting portion 132 correspondingly passes through the opening 113, one side S1 of the outer ring 1331 is in close contact with the first side surface 111, another opposite side S2 of the outer ring 1331 protrudes from the opening 113, one side S3 of the inner ring 1332 is in close contact with the second side surface 112, one blocking portion 1333 is correspondingly located at the first side edge 1131, and the other blocking portion 1333 is correspondingly located at the second side edge 1132. As shown in FIG. 7, when the electronic assembly 130 is assembled in the casing 110, the outer ring 1331, as a complete closed ring, is in close contact with the first side surface 111. However, since the first side edge 1131 and the second side edge 1132 are obliquely connected to the first side surface 111 and the second side surface 112, the outer ring 1331 is further in close contact with a part of the first side edge 1131 and a part of the second side edge 1132, and the side S2 of the outer ring 1331 corresponding to the second side surface 112 is exposed from the opening 113. The inner ring 1332, as an incomplete closed ring, is in close contact with the second side surface 112. In addition, the two blocking portions 1333 between the outer ring 1331 and the inner ring 1332 are respectively in close contact with the first side edge 1131 and the second side edge 1132.

In this way, the inner ring 1332 can prevent water from entering the electronic device 100 through the second side surface 112 at the accommodating slot 114, a part of the first side edge 1131, and a part of the second side edge 1132, water about to enter in a direction of the first side surface 111 at the accommodating slot 114 is stopped by the outer ring 1331 and the two blocking portions 1333, the outer ring 1331 can prevent water from entering the electronic device 100 through the first side surface 111, a part of the first side edge 1131, and a part of the second side edge 1132, and the two blocking portions 1333 can prevent water from entering through the first side edge 1131 and the second side edge 1132. In another embodiment, the outer ring 1331 can prevent water from entering through the first side surface 111, a part of the first side edge 1131, and a part of the second side edge 1132, and water about to enter in a direction of the second side surface 112 is stopped by the inner ring 1332 and the two blocking portions 1333.

Specifically, since the waterproof ring 133 with the outer ring 1331 and the inner ring 1332 is arranged at the connecting portion 132 of the electronic assembly 130, and the blocking portions 1333 are connected to the outer ring 1331 and the inner ring 1332, not only the inner ring 1332 prevents water from seeping from the outside of the electronic device 100, but also the blocking portions 1333 and the outer ring 1331 prevent water from flowing into the casing 110 of the electronic device 100 through a part of the connecting portion 132 exposed from the casing 110 (that is, a position corresponding to the accommodating slot 114, that is, a left side of the first side edge 1131 shown in FIG. 7), to maintain a waterproof function. In another embodiment, the outer ring 1331 prevents water from seeping into the electronic assembly 130 from the inside of the electronic device 100, and water about to flow in through the part of the connecting portion 132 exposed from the casing 110 (a right side of the first side edge 1131 shown in FIG. 7) is stopped by the blocking portions 1333 and the inner ring 1332 and therefore cannot seep into the electronic assembly 130, to maintain the waterproof function.

In an embodiment, the inner ring 1332 has a notch 1334. The notch 1334 faces a top of the body 131. As shown in FIG. 6 and FIG. 7, the inner ring 1332 is an incomplete closed ring, and the notch 1334 thereof faces the first side surface 111 of the casing 110. Since the water in the direction of the first side surface 111 can be stopped by the outer ring 1331, the notch 1334 may be arranged on the inner ring 1332 corresponding to the structure of the casing 110 (the accommodating slot 114), to avoid squeeze of the structure and reduce the material consumption during the assembly.

As shown in FIG. 6 and FIG. 7, in terms of the connection position of the second blocking portions 1333, in an embodiment, when the connecting portion 132 correspondingly passes through the opening 113, the two blocking portions 1333 are located in a range where both the first side edge 1131 and the second side edge 1132 cover the outer ring 1331. For example, if the two blocking portions 1333 are arranged outside the coverage of the first side edge 1131 and the second side edge 1132, the two blocking portions 1333 are exposed from the opening 113, and the external water can enter the casing 110 through the gap between the outer ring 1331 and the inner ring 1332.

As shown in FIG. 4 to FIG. 6, in an embodiment, the connecting portion 132 has a first surface 1321 and a second surface 1322, and the two blocking portions 1333 are respectively arranged on two opposite ends and are located in a distance range of two thirds of a distance from the first surface 1321 to the second surface 1322. By arranging the two blocking portions 1333 close to the side of the first surface 1321, the two blocking portions 1333 are prevented from being exposed from the opening 113 when the electronic assembly 130 is assembled in the casing 110, thereby preventing seeping of the external water.

In terms of the connection manner of the two blocking portions 1333, as shown in FIG. 6, in an embodiment, the waterproof ring 133 has a central axis C. The central axis C passes through the outer ring 1331 and the inner ring 1332, and the two blocking portions 1333 extend in a direction parallel to the central axis C of the outer ring 1331 and the inner ring 1332 and are connected to the outer ring 1331 and the inner ring 1332.

In an embodiment, the outer ring 1331 and the inner ring 1332 are arranged at a specific distance d. Since an excessively small distance between the outer ring 1331 and the inner ring 1332 may lead to a difficulty in structural formation, the specific distance d, for example, 0.5 mm is set.

Figure 8:
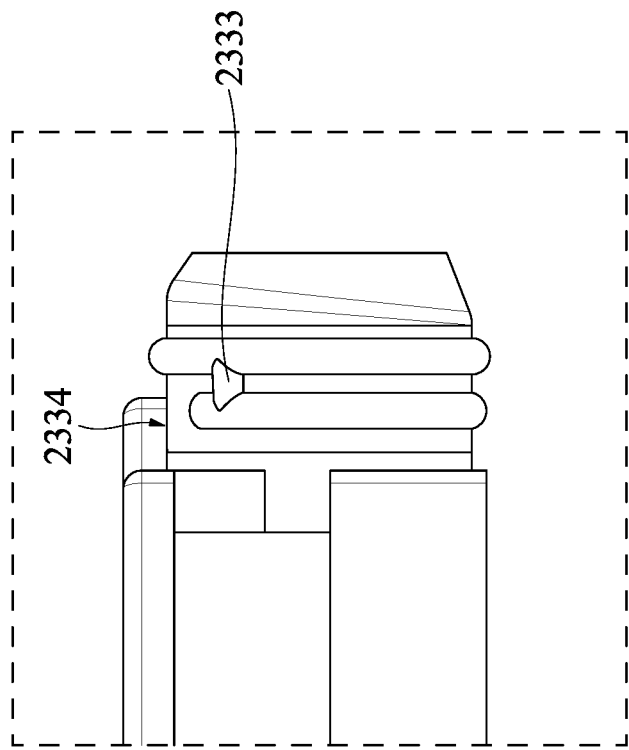
FIG. 8 is a side view of an electronic assembly according to another embodiment.

Referring to FIG. 8, FIG. 8 is a side view of an electronic assembly according to another embodiment. In terms of a connection position of the two blocking portions 1333, in this embodiment, the two blocking portions 2333 are adjacent to a notch 2334. For example, the two blocking portions 2333 may alternatively be located far away from the notch 2334, as long as the two blocking portions 2333 are located in a coverage of the first side edge 1131 and the second side edge 1132, to maintain the waterproof function.

Figure 9:
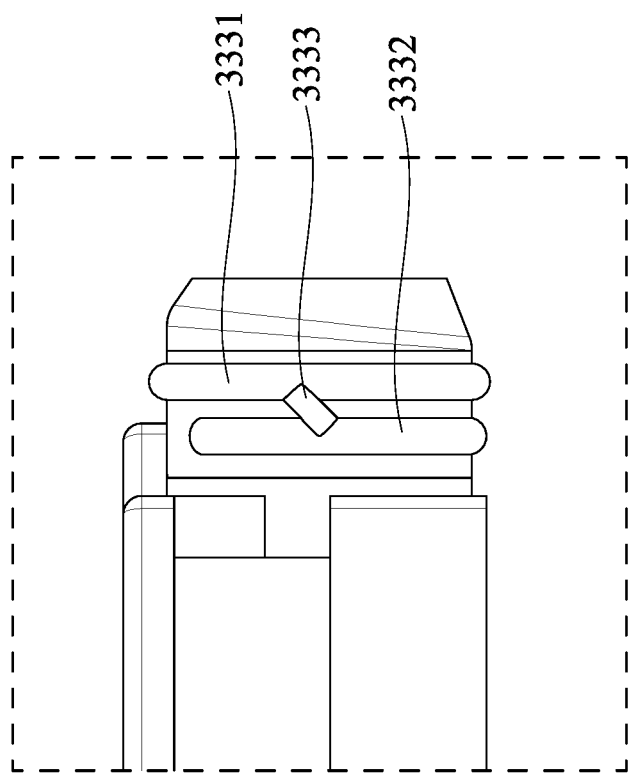
FIG. 9 is a side view of an electronic assembly according to still another embodiment.

Referring to FIG. 9, FIG. 9 is a side view of an electronic assembly according to still another embodiment. In terms of a connection position of the two blocking portions 1333, in this embodiment, the two blocking portions 3333 extend in a direction oblique to an axial direction of an outer ring 3331 and an inner ring 3332 and are connected to the outer ring 3331 and the inner ring 3332. The two blocking portions 3333 may alternatively be obliquely connected to the outer ring 3331 and the inner ring 3332. For example, the two blocking portions 3333 may be correspondingly arranged at edges covered by the first side edge 1131 and the second side edge 1132 respectively, and extend obliquely along the first side edge 1131 and the second side edge 1132 to be connected to the outer ring 3331 and the inner ring 3332.

According to the electronic device and the electronic assembly in the above embodiments, the waterproof ring with the outer ring and the inner ring is arranged at the connecting portion of the electronic assembly, and the blocking portions are connected to the outer ring and the inner ring. Not only the inner ring prevents water from seeping from the outside of the electronic device, but also water about to flow in through the part of the connecting portion exposed from the casing is stopped by the blocking portions and the outer ring and therefore cannot seep into the casing of the electronic device, to maintain the waterproof function. In addition, the outer ring can prevent water from seeping into the electronic assembly from the inside of the electronic device, and water about to flow in through the part of the connecting portion exposed from the casing is stopped by the blocking portions and the inner ring and therefore cannot seep into the electronic assembly, to maintain the waterproof function.

What is claimed is:

1. An electronic device, comprising:
   a casing, having an opening between a first side surface and a second side surface parallel to each other, wherein the opening has a first side edge and a second side edge opposite to each other, and the first side edge and the second side edge are obliquely arranged between the first side surface and the second side surface; and
   an electronic assembly, assembled in the casing and comprising:
      a body;
      a connecting portion, arranged on one side of the body; and
      a waterproof ring, comprising:
         an outer ring, being a closed ring and arranged around an outer surface of the connecting portion;
         an inner ring, arranged on the outer surface of the connecting portion and closer to the body than the outer ring; and
         two blocking portions, each connected to the outer ring and the inner ring, wherein
   when the connecting portion correspondingly passes through the opening, one side of the outer ring is in close contact with the first side surface, one side of the inner ring is in close contact with the second side surface, one blocking portion is correspondingly located at the first side edge, and the other blocking portion is correspondingly located at the second side edge.

2. The electronic device according to claim 1, wherein the other side of the outer ring opposite to the first side surface protrudes from the opening.

3. The electronic device according to claim 1, wherein the inner ring has a notch facing a top of the body.

4. The electronic device according to claim 3, wherein the two blocking portions are adjacent to the notch.

5. The electronic device according to claim 1, wherein when the connecting portion correspondingly passes through the opening, the two blocking portions are located in a range where both the first side edge and the second side edge cover the outer ring.

6. The electronic device according to claim 1, wherein the connecting portion has a first surface and a second surface, and the two blocking portions are respectively arranged on two opposite ends and are located in a distance range of two thirds of a distance from the first surface to the second surface.

7. The electronic device according to claim 1, wherein the outer ring and the inner ring are arranged at a specific distance.

8. The electronic device according to claim 1, wherein the two blocking portions extend in a direction parallel to an axial direction of the outer ring and the inner ring and are connected to the outer ring and the inner ring.

9. The electronic device according to claim 1, wherein the two blocking portions extend in a direction oblique to an axial direction of the outer ring and the inner ring and are connected to the outer ring and the inner ring.

10. An electronic assembly, comprising:
   a body;
   a connecting portion, arranged on one side of the body; and
   a waterproof ring, comprising:
      an outer ring, being a closed ring and arranged around an outer surface of the connecting portion;
      an inner ring, arranged on the outer surface of the connecting portion and closer to the body than the outer ring; and
      two blocking portions, each connected to the outer ring and the inner ring, wherein
      the two blocking portions are respectively located on two opposite ends.

11. The electronic assembly according to claim 10, wherein the inner ring has a notch facing a top of the body.

12. The electronic assembly according to claim 11, wherein the two blocking portions are adjacent to the notch.

13. The electronic assembly according to claim 10, wherein the connecting portion has a first surface and a second surface, and the two blocking portions are respectively arranged on two opposite ends and are located in a distance range of two thirds of a distance from the first surface to the second surface.

14. The electronic assembly according to claim 10, wherein the outer ring and the inner ring are arranged at a specific distance.

15. The electronic assembly according to claim 10, wherein the two blocking portions extend in a direction parallel to an axial direction of the outer ring and the inner ring and are connected to the outer ring and the inner ring.

16. The electronic assembly according to claim 10, wherein the two blocking portions extend in a direction oblique to an axial direction of the outer ring and the inner ring and are connected to the outer ring and the inner ring.

* * * * *